United States Patent [19] [11] 3,930,822

Elmer [45] Jan. 6, 1976

[54] PROCESS FOR MAKING CARBON-CONTAINING GLASS RESISTORS

[75] Inventor: Thomas H. Elmer, Corning, N.Y.

[73] Assignee: Corning Glass Works, Corning, N.Y.

[22] Filed: Jan. 27, 1975

[21] Appl. No.: 544,288

[52] U.S. Cl. .......................... 65/32; 65/60; 427/101; 427/122; 427/228; 428/426

[51] Int. Cl.[2] ...................... C03C 15/00; C03C 7/00

[58] Field of Search ........ 65/32, 30 R, 60; 427/101, 427/122, 228; 428/426

[56] References Cited

UNITED STATES PATENTS

| | | | |
|---|---|---|---|
| 3,378,431 | 4/1968 | Smith, Jr. et al. | 65/32 X |
| 3,390,452 | 7/1968 | Huang | 65/32 X |
| 3,628,984 | 12/1971 | Ishikawa et al. | 427/228 |
| 3,632,385 | 1/1972 | Schmitt et al. | 427/228 |
| 3,640,906 | 2/1972 | Wojcik | 65/30 R X |
| 3,775,078 | 11/1973 | Elmer et al. | 65/32 |
| 3,810,780 | 5/1974 | Ardary et al. | 427/228 |
| 3,813,232 | 5/1974 | Forker, Jr. et al. | 65/32 X |

*Primary Examiner*—S. Leon Bashore
*Assistant Examiner*—Frank W. Miga
*Attorney, Agent, or Firm*—Kees van der Sterre; Clinton S. Janes, Jr.; Clarence R. Patty, Jr.

[57] ABSTRACT

An improved process for the production of carbon-containing glass resistors comprising impregnating porous glass with a furfuryl alcohol solution, flash-heating the impregnated glass at temperatures in the range of 150°–225°C. to polymerize the alcohol to a resin, and firing in a non-oxidizing atmosphere to convert the resin to carbon, is described. Substantially improved yields of high value resistors are obtained by the process.

4 Claims, 2 Drawing Figures

PROCESS FOR MAKING CARBON-CONTAINING GLASS RESISTORS

BACKGROUND OF THE INVENTION

Processes for carbon-impregnating glasses in order to impart electrical conductivity thereto are known. U.S. Pat. No. 2,556,616, for example, describes the impregnation of porous glasses with soluble carbohydrates, particularly sugars, followed by drying and firing to convert the sugars to a continuous conductive carbon phase. Problems attending the use of sugar solutions for this purpose include those relating to the high viscosity and low stability of the solutions, and to the difficulty of obtaining uniform and reproducible carbonization of the sugar impregnant on firing the impregnated glass.

U.S. Pat. No. 3,813,232 describes a method of providing conductive porous glasses which comprises impregnating the porous glass with acetophenone and sulfuric acid, and thereafter heating the impregnated glass to decompose the impregnants and provide a conductive carbon phase in the glass. Disadvantages of this process include the hazards associated with the handling of hot (100°C.) organic and sulfuric acid solutions, and the evolution of copious amounts of noxious sulfur-containing compounds from the glass on heating.

A more convenient method of providing a continuous carbon phase in a porous glass comprises the use of polymerizable furan derivatives as impregnants for this purpose. U.S. Pat. No. 3,775,078 describes the production of carbon-containing porous glasses exhibiting increased refractoriness and electrical conductivity through a process impregnating a porous 96% silica glass with a solution of furfuryl alcohol in a suitable solvent, polymerizing the furfuryl alcohol in situ in the pores of the glass to provide a resin, and firing the glass in a non-oxidizing atmosphere to convert the resin to carbon.

In attempting to adapt the furfuryl alcohol method to the production of electrical resistance elements, serious difficulties were encountered in obtaining reproducible resistance values, even among resistors processed in the same lot or taken from the same section of resistor cane stock. It was recognized that a broad range of resistance characteristics, including room temperature DC resistivities ranging from about $10^{0.01}$–$10^{10}$ ohm centimeters, could be obtained in the product by controlling the amount of furfuryl alcohol and thus the amount of carbon introduced into the pore structure of the glass. However considerable variations in resistivity were observed, particularly in the higher resistivity range of about $10^{1.5}$–$10^{10}$ ohm centimeters, despite attempts to reduce these variations through careful control of glass pore characteristics, impregnating solution composition, impregnation time, drying schedules, and firing treatments.

It is a principle object of the present invention to provide an improved process for the production of electrical resistive elements using furfuryl alcohol to provide a continuous carbon phase in a porous glass, which permits significantly better control over the resistivity of the product.

It is a further object to provide high resistivity electrical resistance elements produced in accordance with this improved process.

SUMMARY OF THE INVENTION

Part of the problem of obtaining reproducible resistance values in carbon-containing glasses produced by the furfuryl alcohol process resides in the fact, evidenced by the graph comprising FIG. 1 of the DRAWING, that resistance is very strongly dependent on the furfuryl alcohol content of the impregnating solution, particularly in that concentration region where the higher resistivity products (log DC volume resistivity of 1.5 –10) are produced. The resistivity of the product is apparently very strongly affected by even minor changes in the carbon content of the glass in this range. Yet it was not understood why wide variations in resistance among samples impregnated with the same solution and having the same processing history were observed. For example, variations in resistivity of as much as a factor of 50 among ¾ inch long resistors cut from a single 3 inch length of resistor cane stock were not uncommon.

I have now discovered that the rate and uniformity of polymerization of the furfuryl alcohol impregnant present in the glass to a resin, prior to firing to obtain conversion to carbon, are important factors affecting the reproducibility of resistance values in carbon-containing glasses produced by this process. I have further found that slow heating rates or heating at moderate temperatures, such as were utilized in the prior art to gradually remove solvents from the glass and polymerize the alcohol, appear to increase the variability of resistance values obtained in the product, for reasons not fully understood. In contrast, I have found that flash-heating of the impregnated glass at temperatures within the range of about 150°–225°C. appears to substantially improve the uniformity of resistance in the product. Thus substantially higher yields of electrical resistance materials having resistivity values within a specified range may be obtained.

Other objects and advantages of the invention will become apparent from the following description thereof, and from the appended DRAWING wherein:

FIG. 1 is a graph showing the relationship between the electrical resistivity of a carbon-impregnated porous glass produced by impregnation, polymerization, and carbonization of a furfuryl alcohol impregnant and the concentration of furfuryl alcohol present in the solution utilized to impregnate the porous glass, and FIG. 2 illustrates the improved yields of high resistivity electrical resistance elements which may be obtained utilizing improved thermal treatments in accordance with the invention.

DETAILED DESCRIPTION

Figure 2:
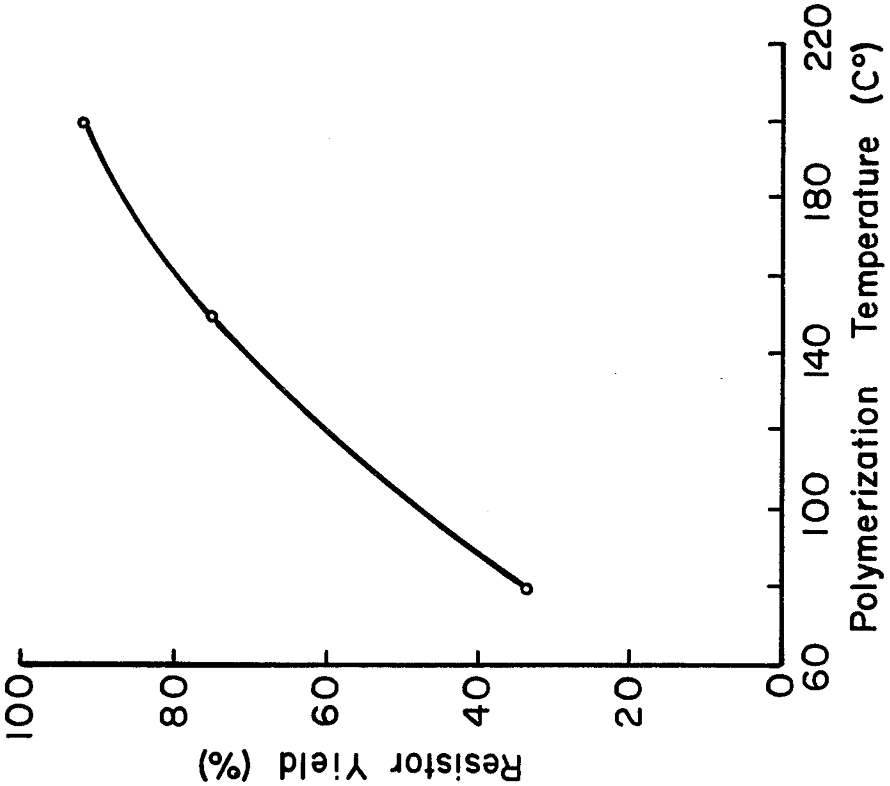
Figure 1:
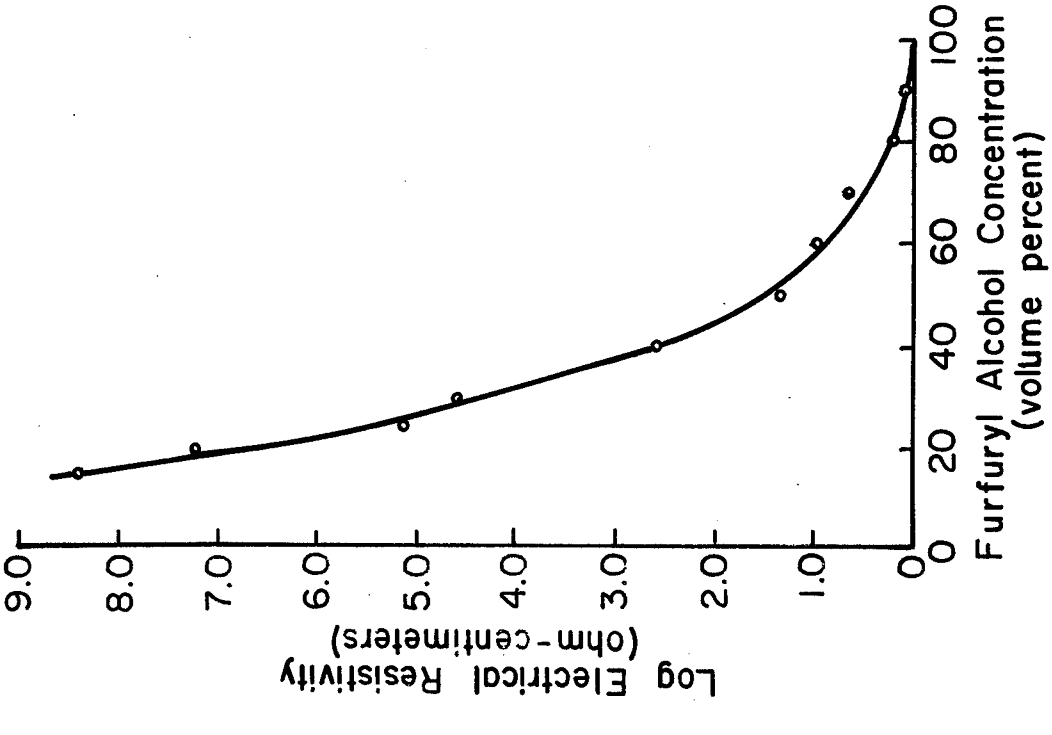

Porous glasses which are the preferred starting materials for the production of electrical resistors in accordance with the invention are the porous 96 percent silica glasses described by Hood et al. in U.S. Pat. No. 2,106,744. These glasses are produced by leaching phase-separated alkali borosilicate glasses to remove the soluble phase, providing a porous glass product comprising a multiplicity of submicroscopic interconnecting pores, the residual glass typically consisting of at least about 94% silica by weight.

Glasses prepared by the process of the aforementioned Hood et al patent are known in the art by the general designation "96 percent silica glasses," without particular regard for the exact silica content thereof, and this general designation will be used herein with that meaning. Thus this designation is used in the generic sense to include all porous glasses produced in accordance with the above-described method from alkali borosilicate glasses, irrespective of the exact silica content of the porous glass.

The initial step of producing electrical resistors according to the invention comprises conventionally impregnating a suitable glass such as a porous 96 percent silica glass with a furfuryl alcohol solution. Impregnation is typically accomplished by immersing the porous glass in the solution for a length of time at least sufficient to insure thorough penetration by the impregnant into the pore structure of the material. Porous 96 percent silica glasses can normally be fully impregnated within an interval of 24 hours, usually much less, by this procedure.

Solutions of furfuryl alcohol which are useful for this purpose include aqueous solutions and aqueous solutions containing stabilizing agents. Such agents prevent the phase separation on standing which is typical of aqueous furfuryl alcohol solutions of low or moderate concentration. I have discovered that the lower alkanols of from 1 to 4 carbon atoms per molecule, e.g., methanol, ethanol, propanol, and butanol, are particularly useful stabilizing agents for dilute aqueous furfuryl alcohol solutions. Dilute solutions are those comprising about 1-50 percent furfuryl alcohol by volume, which are particularly useful in providing electrical resistance materials with resistivities in the $10^{1.5}$–$10^{10}$ ohm-centimeter range. These alkanols may be utilized in such solutions in amounts ranging, for example, from about 10–50 percent by volume, although greater amounts can be used if desired. Preferred solutions consist essentially of furfuryl alcohol, ethanol, and water wherein the ethanol to water ratio ranges up to about 1:1 by volume. Higher concentrations of ethanol may be employed, but are not of significant practical benefit.

Following the impregnation of the porous 96 percent silica glass with an aqueous furfuryl alcohol solution, the furfuryl alcohol is polymerized in situ in the glass to a non-volatile resin, and the glass article containing the polymerized resin is then fired in a non-oxidizing atmosphere to a temperature of at least about 1,200°C. to convert the resin to carbon. This firing treatment, which is conventional, is typically also effective for consolidating the porous glass around the carbon phase, providing an electrically-insulating barrier which additionally protects the carbon phase from oxidation at elevated temperatures.

Whereas the firing treatment utilized in converting the resin in the porous glass to carbon may be any suitable thermal treatment utilized for this purpose in the prior art, gradual heat treatments such as were utilized in the prior art to remove solvents from the impregnating furfuryl alcohol solution and to polymerize the residual alcohol to a resin should be avoided. The porous glass impregnated with the furfuryl alcohol solution should instead be flash-heated to a temperature in the range of about 150°–225°C. for a time at least sufficient to remove volatile alkanol and water solvents and to polymerize the furfuryl alcohol to a resin. In this way, substantially higher yields of electrical resistors having resistance values within a specified resistance range may be obtained.

Removal of volatile solvents and stabilizers, and polymerization of the furfuryl alcohol to a resin rarely require heating for more than about 2 hours at temperatures in the useful range; in fact, initial polymerization of the alcohol, as evidenced by a darkening of the impregnated glass to a black coloration, can be observed after a period of seconds at the prescribed temperatures. In general, higher temperatures within the useful range are preferred, except where the impregnated porous glass is bulky enough to risk fracture due to rapid vaporization and escape of volatile constituents, because higher temperature treatments typically produce a more uniform product. Heating beyond a time sufficient to volatilize solvents and polymerize the furfuryl alcohol impregnant is not detrimental, but does not provide any particular advantage. Heating in air at temperatures in excess of 225°C. during the polymerization step is not desirable because of the possibility that oxidation and loss of the polymerized resin will occur.

Flash-heating polymerization treatments in accordance with the invention can present glass breakage problems if the dimensions of the impregnated glass are too large. Therefore the selection of porous glass articles having at least one dimension (e.g., thickness) not exceeding a value of about 4 millimeters is preferred to avoid the possibility of breakage during flash-heating.

Flash-heating in accordance with the present description means heating rapidly to a temperature in the prescribed 150°–225°C. range, and may comprise sudden exposure to hot air or other hot gases or fluids which have been heated to such temperatures. Alternate means of flash-heating include radiant infrared or microwave heating methods. In general, such treatments will provide conditions which are effective to heat the impregnated glass, or at least the impregnating solution, at rates of at least 750°C. per hour to the useful temperature range.

Following flash-heating to the selected temperature and holding for a time sufficient to achieve solvent volatilization and furfuryl alcohol polymerization, the impregnated porous glass may be cooled to room temperature at any convenient rate. Alternatively it may be immediately subjected to high temperature firing in a non-oxidizing atmosphere to convert the resin to carbon.

The advantages of the method of the present invention in producing electrical resistance materials of improved uniformity are more fully illustrated by the following example.

EXAMPLE

Eight three-inch sections of resistor cane stock, each consisting of a porous 96 percent silica glass rod of about 0.07 inches diameter, are heated at 150°C. for 1 hour to remove mechanically-held water from the pores of the glass. It is desired to make 3 resistors, each ¾ inches in length by 0.07 inches in diameter, and each having a resistance in the range of about $0.06 \times 10^6 - 2 \times 10^6$ ohms, from each section of stock.

The dry sections are cooled to room temperature in a desiccator and then immersed in an impregnating solution composed of 40 percent furfuryl alcohol, 30 percent water and 30 percent ethanol by volume, immersion being continued for 2 hours at room temperature. This immersion period is sufficient to completely impregnate the pore structure of the glass.

After the impregnation treatment, 4 of the impregnated sections, designated Samples 1, 2, 3 and 4, are removed from solution, wiped, and placed in an oven operating at 80°C. for 1 hour to volatilize and remove the ethanol and water, and to polymerize the furfuryl alcohol impregnant. Darkening of the samples evidencing polymerization of the furfuryl alcohol to a resin commences within several minutes at this temperature, and solvent removal and polymerization are complete within the 1 hour heating period.

The other four impregnated sections, designated Samples 5, 6, 7 and 8, are removed from solution and placed in an oven operating at 150°C. for 1 hour to volatilize the solvent constituents and polymerize the furfuryl alcohol impregnant. Darkening of the samples evidencing polymerization of the furfuryl alcohol to a resin commences within seconds at this temperature, and both solvent removal and polymerization are completed within the 1 hour heating period.

Following heat treatment of all samples to obtain polymerization of the furfuryl alcohol, the samples are inserted into tube furnaces and heated in flowing forming gas (92% $N_2$ + 8% $H_2$) at a rate of 100°C./hour from 160°C. to 1,240°C., held at 1,240°C. for 15 minutes, and cooled to about 600°C. prior to removal from the furnace. This treatment is effective in converting the polymerized furfuryl alcohol resin to carbon and in consolidating the porous glass. A linear shrinkage on firing of about 10 percent is observed.

The samples are then cut into top (T), middle (M) and bottom (B) segments, discarding small end sections from each segment to provide ¾ inch lengths and freshly fractured end surfaces. The end surfaces are then silvered and the samples are tested for electrical resistance.

The results of electrical resistance measurements on resistors cut from each of the eight sample sections are set forth in the Table below. Included are the sample numbers, the location within each sample (T, M or B) from which each resistor was cut, and the resistance measured for each resistor. Also included are the percent yields of resistors falling in the desired resistance range of $0.06 \times 10^6 - 2 \times 10^6$ ohms reported separately for the conventionally polymerized Samples 1–4 and the rapidly polymerized Samples 5–8. The importance of carrying out the polymerization step by exposure to elevated temperature in accordance with the invention is evident when comparing the uniformity of resistance values and yield from Samples 5–8 with those of Samples 1–4.

TABLE

| SAMPLES 1–4 (conventional polymerization) | | SAMPLES 5–8 (rapid polymerization) | |
|---|---|---|---|
| Sample No. | Resistance (ohms) | Sample No. | Resistance (ohms) |
| 1 T | $>>10^7$ | 5 T | $0.34 \times 10^6$ |
| M | $>10^7$ | M | $0.12 \times 10^6$ |
| B | $0.5 \times 10^6$ | B | $0.02 \times 10^6$ |
| 2 T | $1.5 \times 10^6$ | 6 T | $0.80 \times 10^6$ |
| M | $1.3 \times 10^6$ | M | $1.5 \times 10^6$ |
| B | $0.05 \times 10^6$ | B | $0.05 \times 10^6$ |
| 3 T | $2.0 \times 10^7$ | 7 T | $1.5 \times 10^6$ |
| M | $>>10^7$ | M | $1.0 \times 10^6$ |
| B | $0.6 \times 10^6$ | B | $0.13 \times 10^6$ |
| 4 T | $1.0 \times 10^7$ | 8 T | $0.13 \times 10^6$ |
| M | $>2.0 \times 10^7$ | M | $0.26 \times 10^6$ |
| B | $2.0 \times 10^7$ | B | $0.05 \times 10^6$ |
| Yield 33% | | Yield 75% | |

Even higher levels of uniformity, and thus higher yields of resistors having values within a specified range, may be obtained where higher temperatures are utilized to achieve even more rapid furfuryl alcohol polymerization. Thus by utilizing the procedures of the above Example, but carrying out the polymerization step by flash heating at 200°C., yields of up to 92 percent of resistors having $0.06 \times 10^6 - 2\times 10^6$ ohm resistances have been obtained.

The relationship between polymerization temperature and yield which may be derived from the above data is set forth in FIG. 2 of the DRAWING. FIG. 2 comprises a graph showing a plot of resistor yield in percent, as hereinabove defined, versus the flash heating polymerization temperature utilized to polymerize the furfuryl alcohol in situ in the porous glass. The substantial improvements obtained by flash heating in the 150°–225°C. temperature range in accordance with the present invention are readily apparent.

From the above description the advantages of the method of the present invention in producing carbon-containing glass electrical resistance materials, particularly in the resistivity range of $10^{1.5} - 10^{10}$ ohm-centimeters, are evident. Such materials are particularly useful in the production of electrical resistors offering unique resistance stability at high temperatures.

I claim:

1. An improved process for making a carbon-impregnated glass electrical resistance material having an electrical resistivity in the $10^{1.5} - 10^{10}$ ohm-centimeter range which comprises the steps of:

a. impregnating a porous 96% silica glass with an aqueous solution of furfuryl alcohol wherein furfuryl alcohol is present in an amount ranging about 1–50 percent by volume;

b. flash heating the solution impregnated porous 96% silica glass to a temperature in the range of about 150°–225°C. and maintaining it at a temperature in that range for a time at least sufficient to polymerize the furfuryl alcohol present in the glass to a resin; and c. firing the glass containing the resin in a non-oxidizing atmosphere to a temperature of at least about 1,200°C. to convert the resin to carbon.

2. A process in accordance with claim 1 wherein flash-heating the solution-impregnated porous 96% silica glass comprises heating the glass at a rate of at least about 750°C. per hour to a temperature in the range of 150°–225°C.

3. A process in accordance with claim 2 wherein the aqueous solution of furfuryl alcohol comprises a stabilizing agent selected from the group consisting of the lower alkanols of from one to four carbon atoms per molecule, said stabilizing agent being present in an amount ranging from about 10–50 percent by volume of said solution.

4. A process in accordance with claim 3 wherein the stabilizing agent is ethanol.

* * * * *